US006832766B2

(12) United States Patent
Stokes

(10) Patent No.: US 6,832,766 B2
(45) Date of Patent: Dec. 21, 2004

(54) PROTECTIVE COVER FOR HANDLE

(76) Inventor: Raushanah Abdullah Stokes, 123 Walnut St., Piscataway, NJ (US) 08851

( * ) Notice: Subject to any disclaimer, the term of this patent is extended or adjusted under 35 U.S.C. 154(b) by 0 days.

(21) Appl. No.: 10/340,437

(22) Filed: Jan. 10, 2003

(65) Prior Publication Data

US 2004/0135329 A1 Jul. 15, 2004

(51) Int. Cl.[7] .............................................. B62D 39/00
(52) U.S. Cl. ............................ 280/33.992; 280/33.993; 280/DIG. 4; 224/409; 16/DIG. 12; 40/308; 150/154
(58) Field of Search ....................... 280/33.991, 33.992, 280/33.993, 304.1, DIG. 4; 150/154, 155; 297/219.1, 219.12; 224/409, 411; 40/308, 310; 16/DIG. 2, DIG. 12, 110 R; 446/7, 146, 227, 230, 72, 73, 74, 77

(56) References Cited

U.S. PATENT DOCUMENTS

| | | | | |
|---|---|---|---|---|
| 4,805,937 A | * | 2/1989 | Boucher et al. ....... | 280/33.992 |
| 4,881,746 A | * | 11/1989 | Andreesen ............. | 280/33.992 |
| 5,425,546 A | * | 6/1995 | Gerber et al. .......... | 280/33.992 |
| 5,702,039 A | * | 12/1997 | Olaiz ........................ | 224/409 |
| 6,065,764 A | * | 5/2000 | Moseley ................ | 280/33.992 |
| 6,206,471 B1 | * | 3/2001 | McGowan ............. | 297/256.17 |
| 6,491,996 B2 | * | 12/2002 | Digangi ....................... | 428/43 |
| 6,676,210 B1 | * | 1/2004 | Peyton ................... | 297/219.12 |

* cited by examiner

*Primary Examiner*—Christopher P. Ellis
*Assistant Examiner*—G B Klebe
(74) *Attorney, Agent, or Firm*—Walter J. Tencza, Jr.

(57) ABSTRACT

A protective covering for a handle is disclosed comprising a front portion, comprised of a soft material and a rear portion, comprised of a water resistant material, attached to the front portion. The protective covering may be attached in a manner so that the rear portion comes in contact with the handle and thus provides a protective barrier against moisture and germs. The protective covering may be removably attached to the handle. The protective covering may be comprised of an attachment portion, into which a bottle or non-spill child's cup can be inserted. At least one object, such as an ornamental object or child play object, can be attached to the front portion.

23 Claims, 4 Drawing Sheets

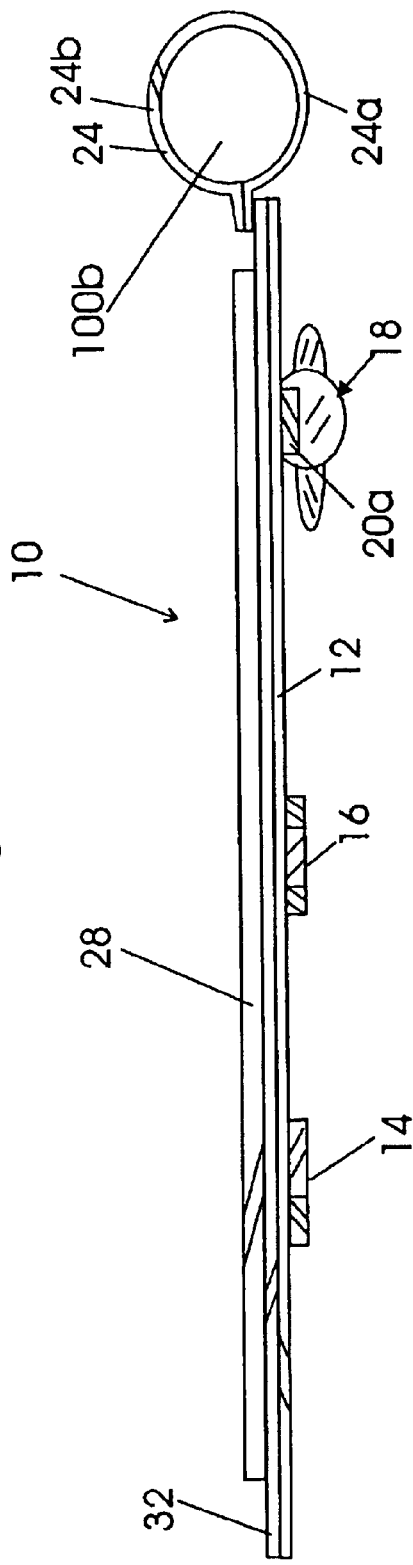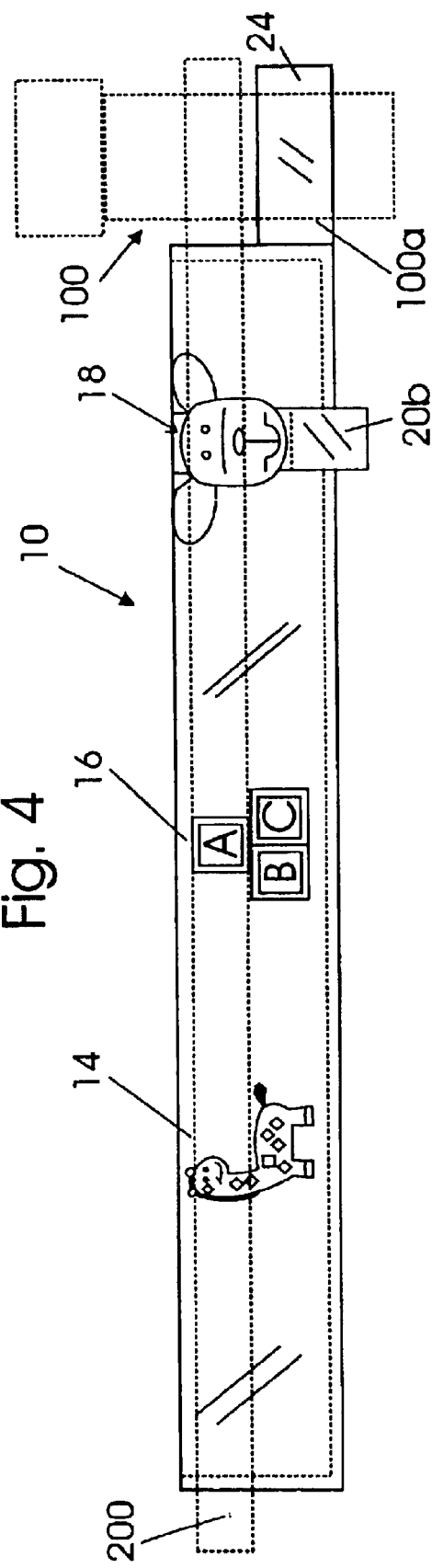

PROTECTIVE COVER FOR HANDLE

FIELD OF THE INVENTION

This invention relates to improved methods and apparatus concerning protective covers for preventing infants or small children from coming into contact with germs or from spreading germs.

BACKGROUND OF THE INVENTION

Typically in the prior art, handles for devices, such as handles for shopping carts, are used by many people. Some of these individuals may transmit germs, such as through their hands, which then remain on the shopping cart handle after the individual is done with the shopping cart. There is a need to prevent the transmission of germs from one person to another. There is particularly a need to prevent the transmission of germs from one person to a baby or from a baby to another person.

SUMMARY OF THE INVENTION

The present invention, in at least one embodiment, provides a protective covering for a handle comprising a front portion and a rear portion attached to the front portion. The rear portion can be comprised of a water resistant material, such as vinyl. A first attachment portion and a second attachment portion may be attached to the rear portion and may be used to temporarily attach the protective covering to a handle of a cart, such as for example, a shopping chart. The protective covering may be attached in a manner so that the rear portion comes in contact with the handle and thus provides a protective barrier against moisture and germs. The protective covering may also be comprised of a third attachment portion, into which a bottle or non-spill child's cup can be inserted.

At least one object, such as an ornamental object or child play object, can be attached to the front portion. An object that makes a rattling noise when shaken can be attached to the front portion. An object that makes a rattling noise may include a strip of material which extends outward from the front portion and which can be easily pulled by a child to make the rattling noise. The front portion may be comprised of a soft material such as a cotton quilt.

The present invention, in at least one embodiment, also includes a method comprising the step of wrapping a protective covering around a handle of a cart; wherein the protective covering is comprised of a front portion, and a rear portion attached to the front portion, the rear portion comprised of a water resistant material. The protective covering can be wrapped around the handle in a manner so that the rear portion comes in contact with the handle. The protective covering can be attached to the handle in a manner which allows the protective covering to be removed.

BRIEF DESCRIPTION OF THE DRAWINGS

FIG. 3 shows a top view of the apparatus of FIG. 1;

FIG. 4 shows a front view of the apparatus of FIG. 1 after the apparatus has been wrapped around a handle, and after a bottle has been placed in the apparatus.

DETAILED DESCRIPTION OF THE DRAWINGS

Figure 1:
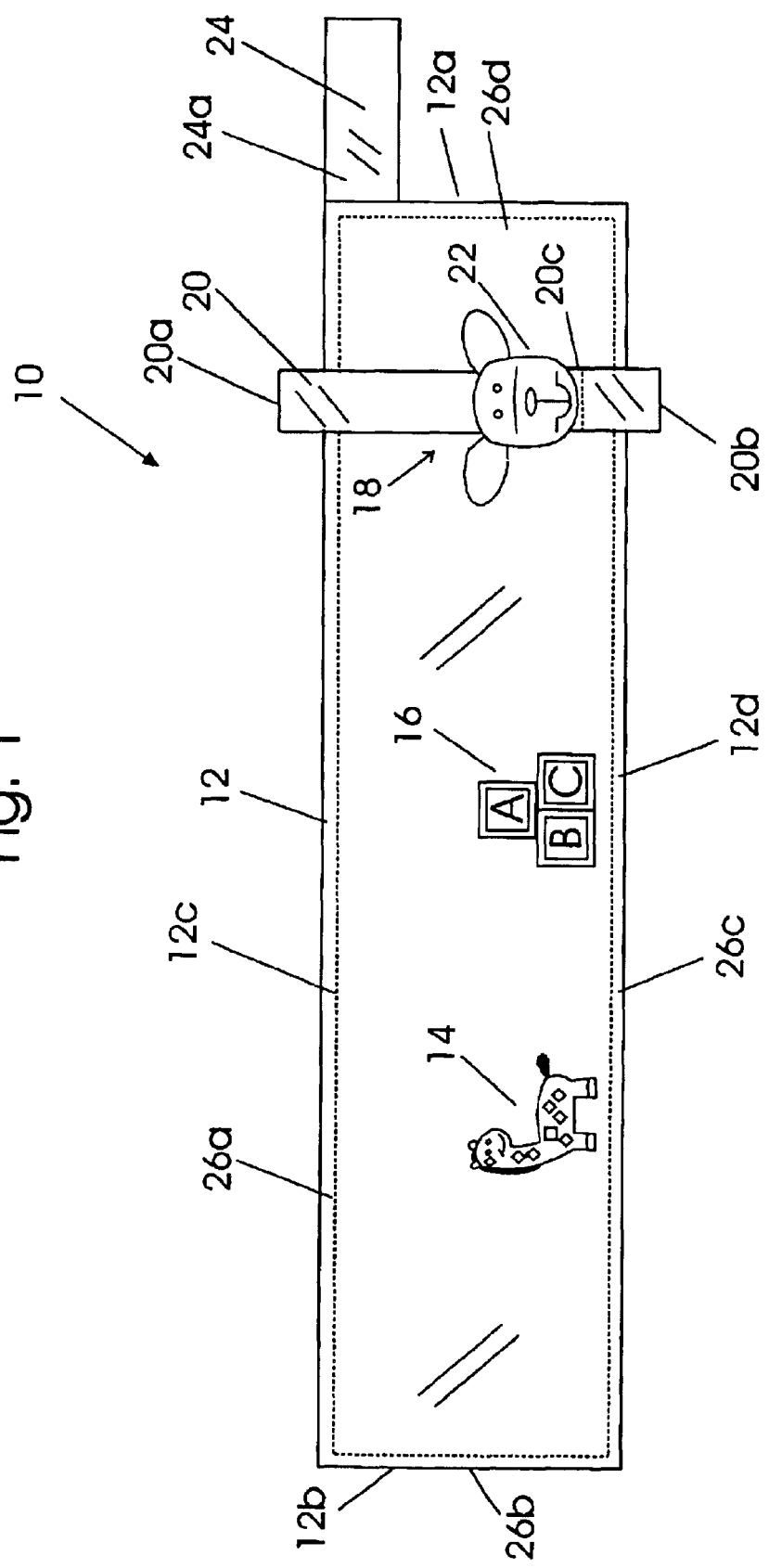
FIG. 1 shows a front view of an apparatus in accordance with an embodiment of the present invention.
Figure 2:
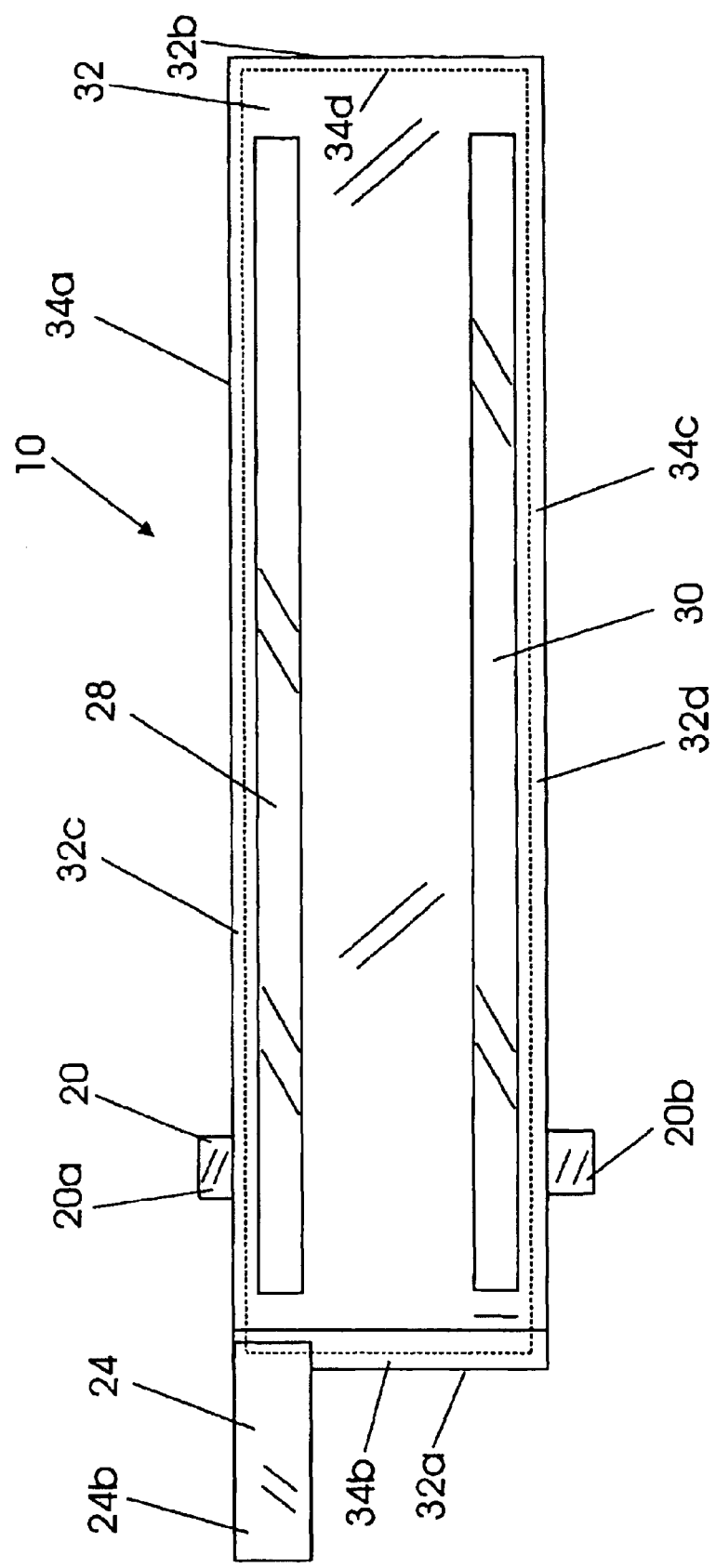
FIG. 2 shows a rear view of the apparatus of FIG. 1.

FIG. 1 shows a front view of an apparatus 10 in accordance with an embodiment of the present invention. FIG. 2 shows a rear view of the apparatus 10. FIG. 3 shows a top view of the apparatus 10. The apparatus 10 or parts of the apparatus 10 may be considered to be protective covering for a handle in accordance with the present invention.

The apparatus 10 is comprised of a front portion 12, objects 14, 16, and 18, and an attachment portion 24 shown in FIG. 1. The attachment portion 24 includes portions 24a and 24b shown in FIG. 3. The apparatus 10 also includes an attachment portion 28, an attachment portion 30, and a rear portion 32 shown in FIG. 2. The front portion 12 may be comprised of a soft quilted material such as a soft quilted cotton. The rear portion 32 may be comprised of a material which provides a protective covering from water or moisture, such as a vinyl or a type of material used for raincoats. The front portion 12 is connected to the rear portion 32 by, for example stitches or sewing. FIG. 1 shows stitches 26a, 26b, 26c, and 26d and FIG. 2 shows stitches 34a, 34b, 34c, and 34d all of which may connect or attach the rear portion 32 to the front portion 12.

The attachment portion 28 may be comprised of hooks or loops, i.e. a first VELCRO (trademarked) hook and loop fastener portion, while the attachment portion 30 may be comprised of a complementary or mating set of loops or hooks, i.e. a second VELCRO (trademarked) hook and loop fastener portion. Typically if the attachment portion 28 is comprised of hooks then the attachment portion 30 will be comprised of loops to mate or connect with the hooks of attachment portion 28. The attachment portions 28 and 30 may be glued or sewed or fixed in any other manner onto the rear portion 32.

The attachment portion 24 may be a strap which allows the insertion of a baby's bottle, such as bottle 100 shown in FIG. 4. The objects 14, 16, and 18 may be play figures or ornamental objects suitable for a child. The object 18 as shown in FIG. 1 may include an elongated strip 20, a head 22. The head 22 may protrude outwards from the front portion 12 of the apparatus 10. The strip 20 may extend from a first end 20a to a second end 20b, wherein both ends 20a and 20b are outside of the front portion 12. The strip 20 can be pulled by a child. The head 22 may be doll like three-dimensional head. The head 22 may contain within the head, small beads or marbles, so that when the strip 20 is pulled the head 22 may make a rattling noise, which may be pleasing to a small child.

Figure 5:
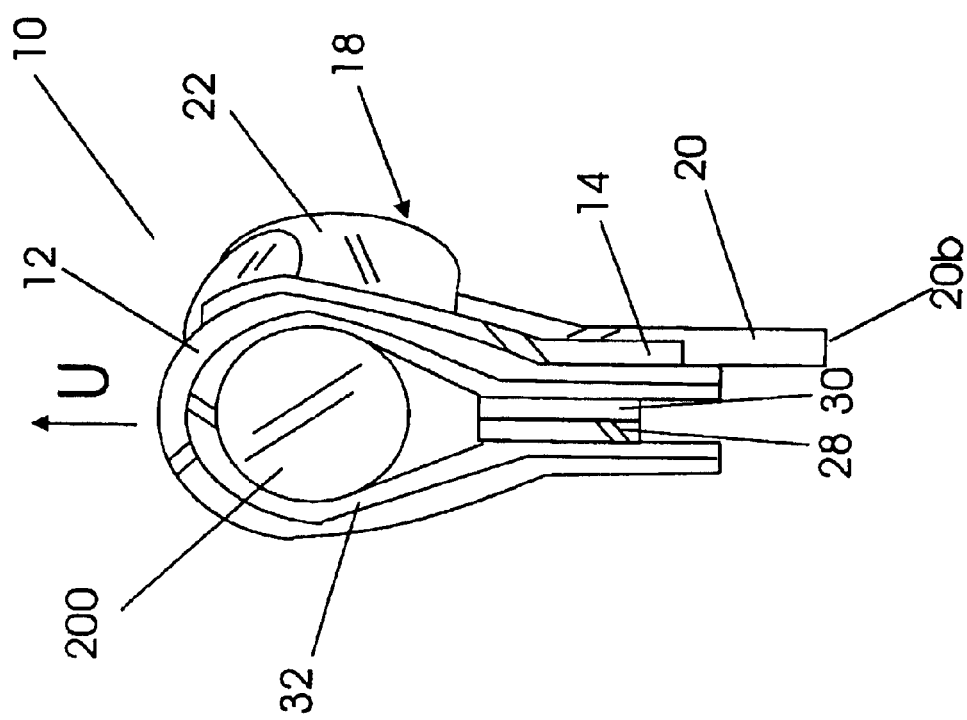
FIG. 5 shows a side view of the apparatus of FIG. 1 after the apparatus has been wrapped around the handle of FIG. 1.

FIG. 4 shows a front view of the apparatus 10 of FIG. 1 after the apparatus 10 has been wrapped around a handle 200, and after the bottle 100 has been placed in the attachment portion 24. The bottle 100 may be cylindrical and FIG. 3 shows the location 100b where the body portion 100a of the bottle 100 would be located within the attachment portion 24. FIG. 5 shows a side view of the apparatus 10 of FIG. 1 after the apparatus 10 has been wrapped around the handle 200 of FIG. 1.

In operation, an individual would wrap the apparatus 10 around a handle, such as a shopping cart handle 200 as shown by FIGS. 4 and 5. With the apparatus 10 in such a position, the rear portion 32 contacts the handle 200. The rear portion 32 is water resistant or waterproof and provides a barrier for preventing moisture and germs from reaching the front portion 12. The attachment portions 28 and 30 are attached together to temporarily attach the apparatus 10 to the handle 200. The apparatus 10 may be wrapped around the handle 200 so that the objects 14, 16, and 18 face into the shopping cart and thus towards a child who may be sitting in a seat of the shopping cart. Alternatively the apparatus 10 may be wrapped around the handle 200 so that the objects 14, 16, and 18 are facing upwards in the direction U, also so that the objects face towards a child, who may be just overhead.

The front portion 12 provides a comfortable and soft alternative to the typically hard, cold, and/or germ laced surface of the handle 200. The front portion 12 may be about twenty inches long from end 12b to end 12a, shown in FIG. 1. The front portion 12 may be about five inches high from end 12d to end 12c.

The play figure nature of the objects 14, 16, and 18 in one embodiment, is attractive to the child's natural senses. The objects 14, 16, and 18 can be replaced by or supplemented by any further number of play figures or ornamental objects. The apparatus 10 can be transferred to any handle, such as handle 200. The apparatus 10 can be washed after every use so that a clean covering can be used any time a parent is using, for example, a shopping cart, having a shopping cart handle, such as 200. The handle 200 may be cylindrical.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A protective covering for a handle comprising
   a front portion;
   a rear portion attached to the front portion;
   a first attachment portion;
   a second attachment portion; and
   and a third attachment portion;
   wherein the first attachment portion can be attached to the second attachment portion to temporarily attach the protective covering to a handle of a cart, in a manner so that the rear portion comes in contact with the handle; and
   wherein a bottle can be secured by the third attachment portion in a substantially upright position, while the protective covering is temporarily attached to the handle of the cart.

2. A protective covering for a handle comprising
   a front portion;
   a rear portion attached to the front portion;
   a first attachment portion;
   a second attachment portion; and
   and a third attachment portion comprising of a closed loop into which a bottle can be inserted to secure the bottle to the protective covering;
   wherein the first attachment portion can be attached to the second attachment portion to temporarily attach the protective covering to a handle of a cart in a manner so that the rear portion comes in contact with the handle; and
   wherein the bottle can be inserted into the closed loop while the protective covering is temporarily attached to the handle of the cart.

3. The apparatus of claim 2 wherein
   the bottle can be secured by the third attachment portion in a substantially upright position, while the protective covering is temporarily attached to the handle of the cart.

4. A protective covering for a handle comprising:
   a front portion having a first end and a second end;
   a rear portion attached to the front portion;
   a first attachment portion;
   a second attachment portion;
   and a third attachment portion which is located at the first end of the front portion;
   wherein the first attachment portion can be attached to the second attachment portion to temporarily attach the protective covering to a handle of a cart, in a manner so that the rear portion comes in contact with the handle; and
   wherein a bottle can be inserted into the third attachment portion so that the third attachment portion secures the bottle to the first end of the front portion of the protective covering while the protective covering is temporarily attached to the handle of the cart.

5. The protective covering of claim 4 wherein
   the rear portion is comprised of a water resistant material.

6. The protective covering of claim 5 wherein
   the front portion is comprised of a soft material.

7. The protective covering of claim 6 wherein
   the front portion is comprised of a quilt.

8. The protective covering of claim 4 and wherein
   the third attachment portion a strip of material into which the bottle can be inserted.

9. The protective covering of claim 4 wherein
   at least one object is attached to the front portion.

10. The protective covering of claim 9 wherein
    the at least one object is an ornamental object.

11. The protective covering of claim 9 and wherein
    the at least one object makes a rattling noise when shaken.

12. The protective covering of claim 11 wherein
    the at least one object is comprised of a strip of material which extends outward from the front portion.

13. The apparatus of claim 4 wherein
    the bottle can be secured by the third attachment portion in a substantially upright position, while the protective covering is temporarily attached to the handle of the cart.

14. The apparatus of claim 4 wherein
    the third attachment portion is comprised of a closed loop into which the bottle can be inserted to secure the bottle to the protective covering; and
    wherein the bottle can be inserted into the closed loop while the protective covering is temporarily attached to the handle of the cart.

15. A method comprising the steps of:
    wrapping a protective covering around a handle of a cart;
    wherein the protective covering is comprised of
    a front portion; and
    a rear portion attached to the front portion;
    and wherein the protective covering is wrapped around the handle in a manner so that the rear portion comes in contact With the handle;
    and further comprising inserting a bottle into a first attachment portion of the protective covering so that the bottle is secured to the protective covering in a substantially upright position, while the protective covering is wrapped around the handle of the cart.

16. A method comprising the steps of:
    wrapping a protective covering around a handle of a cart;

wherein the protective covering is comprised of a front portion; and a rear portion attached to the front portion;

and wherein the protective covering is wrapped around the handle in a manner so that the rear portion comes in contact with the handle;

and further comprising inserting a bottle into a first attachment portion of the protective covering so that the bottle is secured to the front portion of the protective covering, while the protective covering is wrapped around the handle of the cart; and wherein the first attachment portion includes a closed loop and the bottle is inserted into the closed loop to secure the bottle to the front portion of the protective covering.

17. A method comprising the step of:

wrapping a protective covering around a handle of a cart;

wherein the protective covering is comprised of a front portion having a first end and a second end; and a rear portion attached to the front portion;

and wherein the protective covering is wrapped around the handle in a manner so that the rear portion comes in contact with the handle;

and further comprising inserting a bottle into a first attachment portion of the protective covering so that the bottle is secured to the first end of the front portion of the protective covering while the protective covering is wrapped around the handle of the cart.

18. The method of claim 17 further comprising attaching the protective covering to the handle in a manner which allows the protective covering to be removed.

19. The method of claim 18 wherein the protective covering is attached to the handle by use of second and third attachment portions, wherein the second attachment portion is comprised of hooks and the third attachment portion is comprised of loops.

20. The method of claim 17 wherein the front portion of the protective covering is comprised of at least one object.

21. The method of claim 20 wherein the at least one object is an ornamental object.

22. The method of claim 20 wherein the at least one object is an object which when shaken produces a rattling noise.

23. The method of claim 17 wherein the first attachment portion includes a closed loop and the bottle is inserted into the closed loop to secure the bottle to the first end of the front portion of the protective covering.

* * * * *